US010728107B2

(12) United States Patent
Dennis et al.

(10) Patent No.: US 10,728,107 B2
(45) Date of Patent: Jul. 28, 2020

(54) MANAGING USERS OF CLOUD SERVICES WITH MANAGEMENT TOOL

(71) Applicant: SkyKick, Inc., Seattle, WA (US)

(72) Inventors: John Dennis, Oakland, CA (US); Doug Handler, Woodinville, WA (US); Evan Richman, Seattle, WA (US); Todd Schwartz, Seattle, WA (US); Bradley Younge, Denver, CO (US); Matthew Steven Hintzke, Redmond, WA (US); Corey Brent Caldwell, Covington, KY (US); Robert William Davis, Cape Coral, FL (US)

(73) Assignee: SKYKICK, INC., Seattle, WA (US)

( * ) Notice: Subject to any disclaimer, the term of this patent is extended or adjusted under 35 U.S.C. 154(b) by 94 days.

(21) Appl. No.: 15/199,872

(22) Filed: Jun. 30, 2016

(65) Prior Publication Data
US 2017/0006131 A1   Jan. 5, 2017

Related U.S. Application Data

(60) Provisional application No. 62/187,109, filed on Jun. 30, 2015.

(51) Int. Cl.
*H04L 29/08* (2006.01)
*H04L 12/24* (2006.01)
*G06F 16/23* (2019.01)

(52) U.S. Cl.
CPC .......... *H04L 41/22* (2013.01); *G06F 16/2365* (2019.01); *H04L 41/0803* (2013.01);
(Continued)

(58) Field of Classification Search
CPC ..... H04L 41/22; H04L 67/16; H04L 67/1097; H04L 67/306; H04L 41/0803; H04L 67/02; G06F 17/30371
(Continued)

(56) References Cited

U.S. PATENT DOCUMENTS 7,398,238 B1 * 7/2008 Calce ..................... G06Q 40/02
705/35
8,285,864 B2   10/2012 Bagasra et al.
(Continued)

OTHER PUBLICATIONS

"CobbleStone Systems Contract Insight" [online] [Retrieved on Jul. 8, 2016] Retrieved from the internet, URL http://www.pc.mag.com/article2/0,2817,2488143,00.asp.
(Continued)

*Primary Examiner* — Abdullahi E Salad
(74) *Attorney, Agent, or Firm* — Kilpatrick Townsend & Stockton LLP

(57) ABSTRACT

Embodiments can provide centralized management of cloud service providers for one or more customers, including adding, changing or deleting end user data for accessing various cloud services from a common user interface. The common user interface can facilitate configuring user settings for a particular user for different cloud services through a user profile for the particular user. The user profile can be constructed from a corresponding user record stored in a databased. The user record can be updated by obtaining user information from the different cloud services. The obtained user information can be matched to the user record by using one or more criteria. In some embodiments, different criteria can be used for matching information from different cloud services to the user record.

22 Claims, 7 Drawing Sheets

(52) U.S. Cl.
CPC .......... *H04L 67/02* (2013.01); *H04L 67/1097* (2013.01); *H04L 67/16* (2013.01); *H04L 67/306* (2013.01)

(58) Field of Classification Search
USPC ........................................................ 709/226
See application file for complete search history.

(56) References Cited

U.S. PATENT DOCUMENTS

| | | | |
|---|---|---|---|
| 8,606,667 B2 | 12/2013 | Ferris et al. | |
| 8,700,569 B1* | 4/2014 | Wilson ................. | G06F 16/214 707/626 |
| 8,955,080 B2 | 2/2015 | Brunswig et al. | |
| 9,043,278 B1* | 5/2015 | Wilson ................. | G06F 16/27 707/626 |
| 9,172,621 B1* | 10/2015 | Dippenaar ............ | H04L 41/18 |
| 9,229,905 B1* | 1/2016 | Penilla ................. | G06F 17/00 |
| 9,497,136 B1* | 11/2016 | Ramarao .............. | G06F 9/45558 |
| 9,560,132 B1* | 1/2017 | Shanmugam ....... | H04L 67/1095 |
| 9,600,547 B2* | 3/2017 | Holmes ............. | G06F 17/30563 |
| 9,799,001 B2* | 10/2017 | Burckart ............. | G06Q 10/087 |
| 9,819,669 B1* | 11/2017 | Golwalkar .......... | H04L 63/0815 |
| 2008/0028069 A1* | 1/2008 | Urbanek ............. | G06Q 10/063 709/224 |
| 2009/0313598 A1* | 12/2009 | Donaldson ............. | G06Q 10/10 717/101 |
| 2010/0088281 A1* | 4/2010 | Driesen ................. | G06F 8/65 707/641 |
| 2010/0306088 A1* | 12/2010 | Gelerman ........... | G06F 21/6218 705/30 |
| 2011/0225232 A1* | 9/2011 | Casalaina ......... | G06F 17/30528 709/203 |
| 2011/0264541 A1* | 10/2011 | Mohamedsadakathulla ................ G06Q 30/02 705/14.73 |  |
| 2011/0302277 A1* | 12/2011 | Baker ................. | G06F 17/30575 709/219 |
| 2012/0023107 A1* | 1/2012 | Nachnani .......... | G06F 16/24532 707/748 |
| 2012/0109873 A1* | 5/2012 | Xiong ................. | G06Q 10/0633 706/52 |
| 2012/0215554 A1* | 8/2012 | Yurkovich ............. | G06Q 10/10 705/2 |
| 2012/0284776 A1* | 11/2012 | Sundaram ........... | G06F 21/6218 726/4 |
| 2013/0007760 A1* | 1/2013 | O'Sullivan ............ | G06Q 10/00 718/104 |
| 2013/0031136 A1* | 1/2013 | Shah ................. | G06F 17/30528 707/783 |
| 2013/0132404 A1* | 5/2013 | Liu ........................ | G06F 16/27 707/748 |
| 2013/0212200 A1* | 8/2013 | Dennis .................... | H04L 51/22 709/206 |
| 2013/0227653 A1* | 8/2013 | Choi ....................... | H04L 67/02 726/4 |
| 2013/0290406 A1* | 10/2013 | Calvin .................... | H04L 67/42 709/203 |
| 2013/0311498 A1* | 11/2013 | Lambert ............... | G06F 16/215 707/758 |
| 2013/0325906 A1* | 12/2013 | Qiu ....................... | G06F 17/303 707/803 |
| 2014/0013247 A1* | 1/2014 | Beechuk ............... | H04L 65/403 715/753 |
| 2014/0019415 A1* | 1/2014 | Barker ................... | G06F 17/303 707/643 |
| 2014/0059232 A1* | 2/2014 | Plattner ............... | H04L 67/1029 709/226 |
| 2014/0075565 A1 | 3/2014 | Srinivasan et al. | |
| 2014/0081903 A1* | 3/2014 | Koosel ............. | G06F 17/30563 707/602 |
| 2014/0108515 A1* | 4/2014 | Stawikowski ........ | H04L 67/025 709/203 |
| 2014/0136233 A1* | 5/2014 | Atkinson ............... | G16H 15/00 705/3 |
| 2014/0149494 A1* | 5/2014 | Markley ................. | H04L 67/34 709/203 |
| 2014/0195644 A1* | 7/2014 | Marin .................. | H04L 12/1859 709/218 |
| 2014/0222966 A1* | 8/2014 | Marins .................... | H04L 67/02 709/219 |
| 2014/0244300 A1* | 8/2014 | Bess ....................... | G06F 16/22 705/3 |
| 2014/0278821 A1* | 9/2014 | McConnell ........ | G06Q 10/0639 705/7.38 |
| 2014/0282938 A1* | 9/2014 | Moisa ................. | G06F 21/6218 726/6 |
| 2014/0380180 A1* | 12/2014 | Casalaina ......... | G06F 17/30528 715/738 |
| 2015/0012565 A1* | 1/2015 | Engberg ............. | G06F 21/6218 707/783 |
| 2015/0067171 A1* | 3/2015 | Yum ...................... | G06F 9/5072 709/226 |
| 2015/0220312 A1* | 8/2015 | Jemiolo .............. | G06F 17/3089 715/234 |
| 2015/0222616 A1 | 8/2015 | Tarlano et al. | |
| 2015/0261917 A1* | 9/2015 | Smith .................. | G06F 21/6263 705/3 |
| 2015/0304279 A1 | 10/2015 | Bui et al. | |
| 2015/0347541 A1* | 12/2015 | Holmes ............. | G06F 17/30563 707/602 |
| 2016/0036893 A1* | 2/2016 | Pomerantz .............. | H04L 47/70 709/201 |
| 2016/0098470 A1* | 4/2016 | Richman ........... | G06F 17/30575 709/203 |
| 2016/0099998 A1* | 4/2016 | Richman ............. | H04L 67/1095 709/202 |
| 2016/0110370 A1* | 4/2016 | Wetherall ................ | G06F 16/93 707/825 |
| 2016/0117697 A1* | 4/2016 | Briere .................... | G06F 16/958 705/7.29 |
| 2016/0132214 A1* | 5/2016 | Koushik ............. | G06F 3/04842 715/741 |
| 2016/0132310 A1* | 5/2016 | Koushik .................... | G06F 8/61 717/176 |
| 2016/0132806 A1 | 5/2016 | To et al. | |
| 2016/0142399 A1* | 5/2016 | Pace ................... | H04L 63/0815 726/4 |
| 2016/0164722 A1* | 6/2016 | Zhu ....................... | H04L 41/082 709/221 |
| 2016/0212099 A1* | 7/2016 | Zou ...................... | H04L 63/0263 |
| 2016/0246821 A1* | 8/2016 | Meder .................... | G06F 17/303 |
| 2016/0292043 A1* | 10/2016 | Dennis ................ | G06F 11/1451 |
| 2016/0292152 A1* | 10/2016 | Dennis .................. | G06F 17/303 |
| 2016/0308726 A1* | 10/2016 | Dennis ................ | H04L 67/1002 |
| 2016/0344740 A1* | 11/2016 | Choi .................... | H04L 63/102 |
| 2016/0364927 A1* | 12/2016 | Barry ...................... | H04L 63/08 |
| 2017/0262586 A1* | 9/2017 | Bess ...................... | G06F 19/00 |
| 2018/0005165 A1* | 1/2018 | Winters .......... | G06Q 10/063114 |
| 2018/0077084 A1* | 3/2018 | Johnston ................. | G06F 8/65 |

OTHER PUBLICATIONS

"OneLogin" [online] [Retrieved on Jul. 8, 2016] Retrieved from the internet, URL http://www.pcmag.com/article.2/0,2317,2491439,00.asp.

U.S. Appl. No. 15/199,932 Final Office Action, dated Mar. 5, 2019.

* cited by examiner

MANAGING USERS OF CLOUD SERVICES WITH MANAGEMENT TOOL

CROSS-REFERENCES TO RELATED APPLICATIONS

This application claims the benefit of U.S. Provisional Application No. 62/187,109 filed Jun. 30, 2015 entitled "MANAGING USERS OF CLOUD SERVICES WITH MANAGEMENT TOOL" of which is incorporated by reference herein in its entirety for all purposes.

This application is related to U.S. Provisional Application No. 62/187,118 filed Jun. 30, 2015, entitled "USE AND CONFIGURATION OF TEMPLATES FOR MANAGEMENT OF CLOUD PROVIDERS" and U.S. Provisional Application Ser. No. 62/187,124 filed Jun. 30, 2015, entitled "SYNCHRONIZING DATA BETWEEN CLOUD MANAGER AND PROVIDERS" each of which is incorporated by reference herein in their entirety for all purposes.

This application is related to U.S. Non-Provisional application Ser. No. 15/199,930, filed Jun. 30, 2016, entitled "USE AND CONFIGURATION OF TEMPLATES FOR MANAGEMENT OF CLOUD PROVIDERS" and U.S. Non-Provisional application Ser. No. 15/199,932, filed Jun. 30, 2016, entitled "SYNCHRONIZING DATA BETWEEN CLOUD MANAGER AND PROVIDERS" each of which is incorporated by reference herein in their entirety for all purposes.

FIELD

The disclosure generally relates to user management for cloud-based services. Specifically, the disclosure relates to enhanced user management for various cloud services via common interfaces and data aggregation.

BACKGROUND

Modern companies and associated IT consulting firms need to manage the software services that the companies provide to employees. This process can involve the provision of a variety of cloud-based services from a variety of providers to employees of the company. Companies can manage their own IT services, and also can hire IT consulting firms to manage all or part of the IT environment for the company as the management can be costly, complex and time consuming for companies managing directly. The services can often have various differing user interfaces and data formats, which can require a high level of overhead to manage. For example, these software services such as Office 365, Salesforce, Dropbox, Box, Adobe, Google Apps, etc., all require management when users are to be added, removed, or changed.

To provide management of the software experience of users of a company, where the company employees can use various software from many different cloud-based services, can prove challenging when having to use the various individual user interfaces provided by the software providers. The process often involved in the establishment of users or for any other kind of management can be on a one off basis, using strictly the tools from a cloud service which can require administrators to individually log in to each of those cloud systems manually in order to manage a subscription, users, or other administrative tasks for that company.

Embodiments of the invention address these and other problems, individually and collectively.

BRIEF SUMMARY

Embodiments can provide centralized management for various cloud services subscribed to by an entity, such as a company, an organization, a school, a government agency, or the like. A management tool can be provided to facilitate centralized user management for the cloud services. For example, the management tool can be used to add or modify user settings for the cloud services. In some embodiments, settings or activated features for a given user for the cloud services can be displayed through a common graphical user interface through a user profile for the given user. The graphical user interface can enable, for example an administrator of the entity, to modify settings of different cloud services through the user profile for the given user without having to do them separately. In this way, the management tool can provide a single point of control for controlling the various cloud services for the given user.

Embodiments can match user information from different cloud services to specific users within the entity by using different criteria. For example, user information can be obtained from a first cloud server providing a first cloud service subscribed to by the entity, and can be matched to a user record for a particular user record based on first criteria. User information can be obtained from a second cloud server providing a second cloud service subscribed to by the entity and can be matched to the user record for the particular user based on second criteria. The matched user information can then be used to update a user record for the particular user. The user record can be used to construct the aforementioned user profile.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
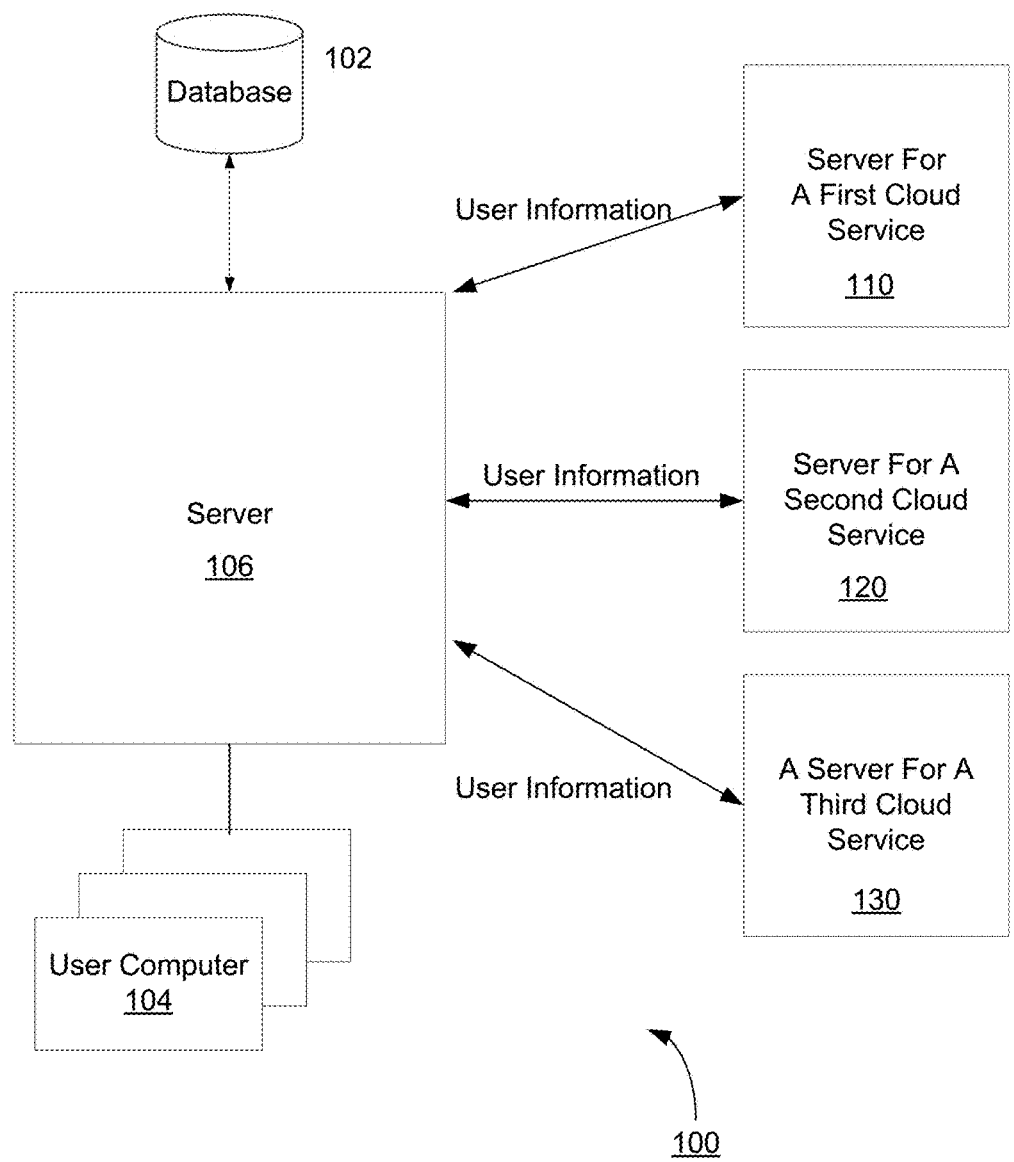
FIG. 1 illustrates an exemplary system architecture for enabling individual users within an entity to use multiple cloud services in accordance with the disclosure.

Embodiments can enable centralized management of cloud services through user profiles. Unlike conventional technologies, the centralized cloud service management techniques in accordance with the disclosure can provide a single point of control of cloud services provided to users within an entity. In various embodiments, a graphical user interface (GUI) is provided to facilitate management of the user profiles for the users within the entity. The user profiles can be used to facilitate the users to use various cloud services subscribed to by the entity. The GUI can be used to administer various settings, features, and/or any other aspects associated with the cloud services for the users. For example, the GUI can enable an administrator within the entity to configure one or more settings associated with a first cloud service, and one or more settings associated with a second cloud service for a given user with in the entity.

Embodiments in accordance with the disclosure can aggregate user information from different cloud services for a particular user within the entity. For example, the particular user may have a user account on the first cloud service, and another user account on the second cloud service. Each of those user accounts may comprise specific user information regarding a use of the respective services by the particular user, such as a specific license granted to the particular user for a first cloud service, one or more features activated for the particular user on a second cloud service, one or more cloud service groups the particular user is assigned to on a third cloud service, and/or any other user information regarding the user's use of the cloud services. Such user information from different cloud services can be stored in association with the particular user such that the centralized user management for the cloud services can be facilitated.

I. User Information from Different Cloud Services

As more and more software services are shifting to be cloud-based, an entity, such as a company, may subscribe to multiple cloud-based software services for its users. For example, the company may subscribe to a cloud-based email service to enable email communications for their employees, to an online storage service to enable network storage for their employees, to a backup service to enable backing up of important resources, and so on. Each of these cloud services, as subscribed to by the company, may provide a set of features for use by certain users of the company. In some situations, a particular cloud service may have a number of licenses assigned to individual users of the company.

For example, without limitation, the cloud-based email service mentioned above can have multiple email accounts or inboxes associated with individual users of the company. Each of those email accounts may comprise user information pertinent to a user of the company. For instance, a particular employee of the company may have an email account with the cloud-based email service. The email account may comprise user information such as an email address for the particular employee, one or more email features activated for the particular employee (e.g., advanced email search, archive support and daily backup), a type of end user license granted to the particular employee, one or more groups the particular employee is assigned to and/or any other user information pertinent to the particular employee for the cloud-based email service. The particular employee may also have a network storage account with a network storage service such that the particular employee is enabled to store or retrieve electronic information through the network storage. For instance, the network storage account for the particular employee may comprise information such as a user name of the particular employee, a password, an indication of authentication method (e.g., SSL, a real-world name for the particular employee, a type of license granted to the particular employee, a storage size limit, daily upload/download throughput limit and/or any other user information.

A. System Architecture

FIG. 1 illustrates an exemplary system architecture 100 for managing individual users within an entity to use multiple cloud services in accordance with the disclosure. As shown, the system architecture 100 may include a server 106 provided by the entity. In certain implementations, the server 106 may include one or more processors configured to perform web services, processing jobs and/or to perform any other functions. The server 106 may be configured to facilitate user management for different cloud services subscribed to by the entity, to enable the users to use the cloud services via the individual client computers 104, and/or to perform any other functions.

The server 106 may be configured to facilitate user management for different cloud services subscribed to by the entity, to enable the users to user the cloud services via the individual client computers 104, and/or to perform any other functions. As shown, the server 106 may be operatively coupled to a database 102, which can contain user records for constructing user profiles associated with the individual users of the entity. A user profile associated with a particular user of the entity may comprise information indicating specific cloud services provided by the user. For each of the specific cloud services, one or more features or settings that are available for the individual users, values (default or configured) for those features or settings for the particular user, and/or any other information can be indicated through the user profile. As will be described below, the user profile associated with the particular user can be used to facilitate the particular user to use the cloud services available to the particular user as subscribed to by the entity.

In some embodiments, server 106 can be configured to provide virtualization of groups or teams of employees within the entity, and the ability to apply various actions across cloud services to groups or teams of users. For example, different groups or teams within the entity include sales, marketing, engineering, or the like.

The server 106 can be configured to communicate with cloud servers, such as cloud servers 110, 120, 130 shown in this example. As shown, each of the cloud servers 110, 120, 130 may be provided by a cloud service provider for facilitating respective cloud-based services. For example, the cloud server 110 may be a server that facilitates a cloud-based email service. The cloud server 120 may be a server that facilitates a network storage service. The cloud server 130 may be a server that facilitates a cloud-based backup service. As also shown, the server 106 may be configured to communicate with each of the cloud servers 110, 120, 130.

The communication between the server 106 and the cloud servers may include communication of user information. For enabling the respective cloud service for the users within the entity, a given cloud server may store user information for those users. For example, as mentioned above, the email cloud service provider may keep a set of user information for providing the email service to the users in the entity, and the network storage service provider may keep another set of user information for providing network storage service to the users in the entity.

B. User Information Discovery

For obtaining user configurations, settings, features activated, license information and/or any other user information from different cloud services subscribed to by the entity, the server 106 may be configured to engage in a user information discovery process. During the user information discovery process, each cloud server, such as cloud server 110, 120, or 130, can be contacted to obtain user information pertinent to the users within the entity. For example, a command may be fired off during the user information discovery process to obtain user information from cloud server 110. The command may include identification information that identifies the entity for the first cloud service (e.g., an email service), such as a domain name, or a company name associated with the entity. The cloud server 110 may then retrieve the requested user information and return it to the server 106. The requested user information may represent all of the user information pertinent to the users within the entity that have been registered with the first cloud service.

In some embodiments, the user information discovery process may be scheduled on the server 106 to run periodically, such as nightly or weekly. In those embodiments, the user information discovery process may start at the same time on those basses. For example, the user information discovery process can be scheduled to start 11 pm every night. During that process, desired cloud servers that provide cloud services to the entity can be contacted and user information can be obtained from the cloud servers. However, this is not intended to be limiting. In some implementations, the user information discovery process can be started manually by an administrator of the entity.

In some embodiments, the server 106 may be configured to generate error messages or alerts when the user information discovery process is not successful in obtaining user information from one or more of the cloud servers. For example, in response to server 120 not responding to the user information discovery process, the server 106 can be configured to generate an alert to notify an administrator of the entity that server 120 is not responding to the user information request during the discovery process.

Issues could also arise when connections to one or more cloud services cannot be established, or where connections to providers are throttled or otherwise limited. If a connection were to fail and the tool did not have a connection to the cloud service at a particular time, the server 106 can be configured to place the connection requests in a queue, this queue could be used to hold those actions until server 106 can communicate with the cloud server.

In some embodiments, the server 106 may be configured to enable an administrator of the entity to specify which one or ones of cloud services to be included in the user information discovery process. In those embodiments, a separate configuration file may be stored on server 106 for each cloud service. The configuration file may include information such as which server(s) of the cloud service to contact in a sequence, addresses of those servers, and/or any other server information. In those embodiments, a user interface may be provided to the administrator to enable the administrator to select the cloud services to be included in the user information discovery process.

C. User Information Processing

Since many cloud service providers operate independently, the user information maintained by them for enabling their respective services are typically not coordinated. That is, for a particular user within the entity, a set of user information may be maintained by a first cloud service for enabling the particular user to use the first cloud service, and another set of user information may be maintained by a second cloud service for enabling the particular user to use the second cloud service. The two sets of user information could have some overlap information, but they may be very different. For example, the first set of user information may include a user ID identifying the particular user for the first cloud service, while the second set of user information may include another user ID identifying the particular user for the second service, and the two different user IDs could be very different, even though they identify the same user. Accordingly, processing of the user information obtained from different cloud servers is desired to consolidate or match it to specific users within the entity.

Figure 2:
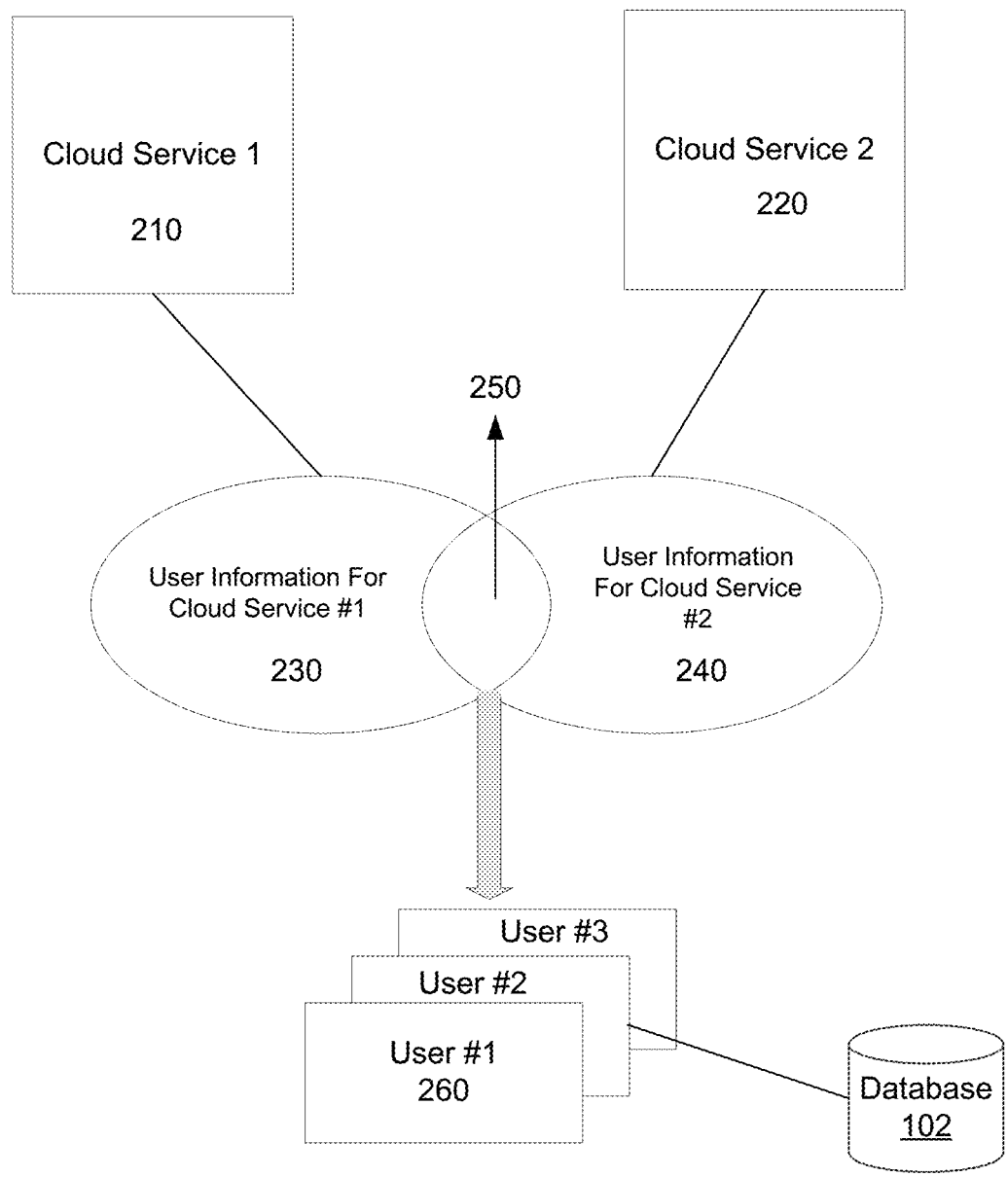
FIG. 2 illustrates processing user information from two cloud services to match specific users within an entity in accordance with one embodiment of the disclosure.

FIG. 2 illustrates processing user information from two cloud services, cloud services 210 and 220, to match specific users within an entity in accordance with one embodiment of the disclosure. As shown, user information 230 may be obtained from cloud service 210, and user information 240 may be obtained from cloud service 220 through the user information discovery process described above. The user information 230 may indicate a set of users within the entity are licensed to use cloud service 210, and may include configuration information indicating settings configured for and/or features activated for those users for using the cloud service 210. The user information 240 may indicate a set of users within the entity are licensed to use cloud service 220, and may include configuration information indicating setting configured for and features activate for those users to use cloud service 220. As shown, the user information 230 and 240 may have some overlapping information 250, such as the names of the users that are licensed to use both cloud services 210 and 220.

As described above, the database 102 can be employed to store user records for individual users of the entity. The user information from different cloud services can be processed to match the user records stored in database 102. The user information from different cloud services can then be used to update matched user records or to create new user records.

1. Criteria Based User Matching

For matching the user information from different cloud services to specific users within the entity, a criteria based method may be used. In one embodiment, criteria, such as a username, an email address, or a user name of the user may be selected for matching user information from the cloud services to the individual users within the entity. For example, criteria of an email address may be used to match the user information from a particular cloud service to the user records of individual users within the entity. For instance, user settings, license information, features activated and/or any other user information associated with a particular email address in the user information from the particular cloud service may be matched to a user having the same email address as indicated by a user record for that user as stored in the database 102. Once a match is found, the matched user information from the cloud service may be used to update the matched user record in the database 102.

In some embodiments, different criteria may be selected for matching user information from different cloud services to the user records. For example, criteria of an email address may be selected for matching user information 230 from cloud service 210, and criteria of user name may be used to match user information 240 from cloud service 220. In some implementations, a user interface may be provided to enable an administrator of the entity to specify which matching criteria to use for a particular cloud service. In those implementations, the server 106 may be configured to prompt the administrator which criteria may be appropriate for matching user information from a particular cloud service. For instance, the server 106 may be configured to analyze the user information from the particular cloud service and determine which part of the user information from the particular cloud service may be used to match individual users. However, it should be understood that the matching of user information from different cloud services may not necessarily be limited to using different criteria. In certain embodiments, the matching criteria for different cloud services can be the same.

In some embodiments, heuristic or fuzzy matching may be used to match user information from a cloud service to a particular user based on a selected criteria. For example, one or more matching rules may be used for the selected criteria. For example, the selected criteria may be a user name of a user, and a matching rule may specify if a threshold number of alphabets in the name obtained from the cloud service matches the user name as stored in the database 102, then a match is found and user information associated with that user name from the cloud service may be stored in association with the particular user. As another example, if Robert was listed as a first name of the user, server 106 could be configured to check for all of the variations, such as Bob, Bobby, Rob, and so on. Server 106 could be configured with similar logic, not just for first name and last name but with email address and other appropriate account data as well.

2. New User Creation Based on Unmatched User Information

User information from the cloud services may not be matched to user records stored in the database 102. For example, certain users within the entity may have user information on a particular cloud service, but may not yet have user records established in the database 102. In some embodiments, the server 106 may be configured to create new user accounts for such users based on user information from one or more cloud services not matching any user records stored in database 102. In implementations, required user information for establishing a user account or user record, such as user name, user ID, employee ID and so on, may be gathered from user information from the cloud services. In certain implementations, a notification may be generated upon such user accounts have been newly created and forwarded to an administrator of the entity.

D. Updating User Records

After user information from a particular cloud service is matched to a particular user record, one or more fields within the user records can be updated, added, or deleted based on matched user information. In some embodiments, the individual user records stored in database 102 may comprise cloud service information for different cloud services.

Figure 5:
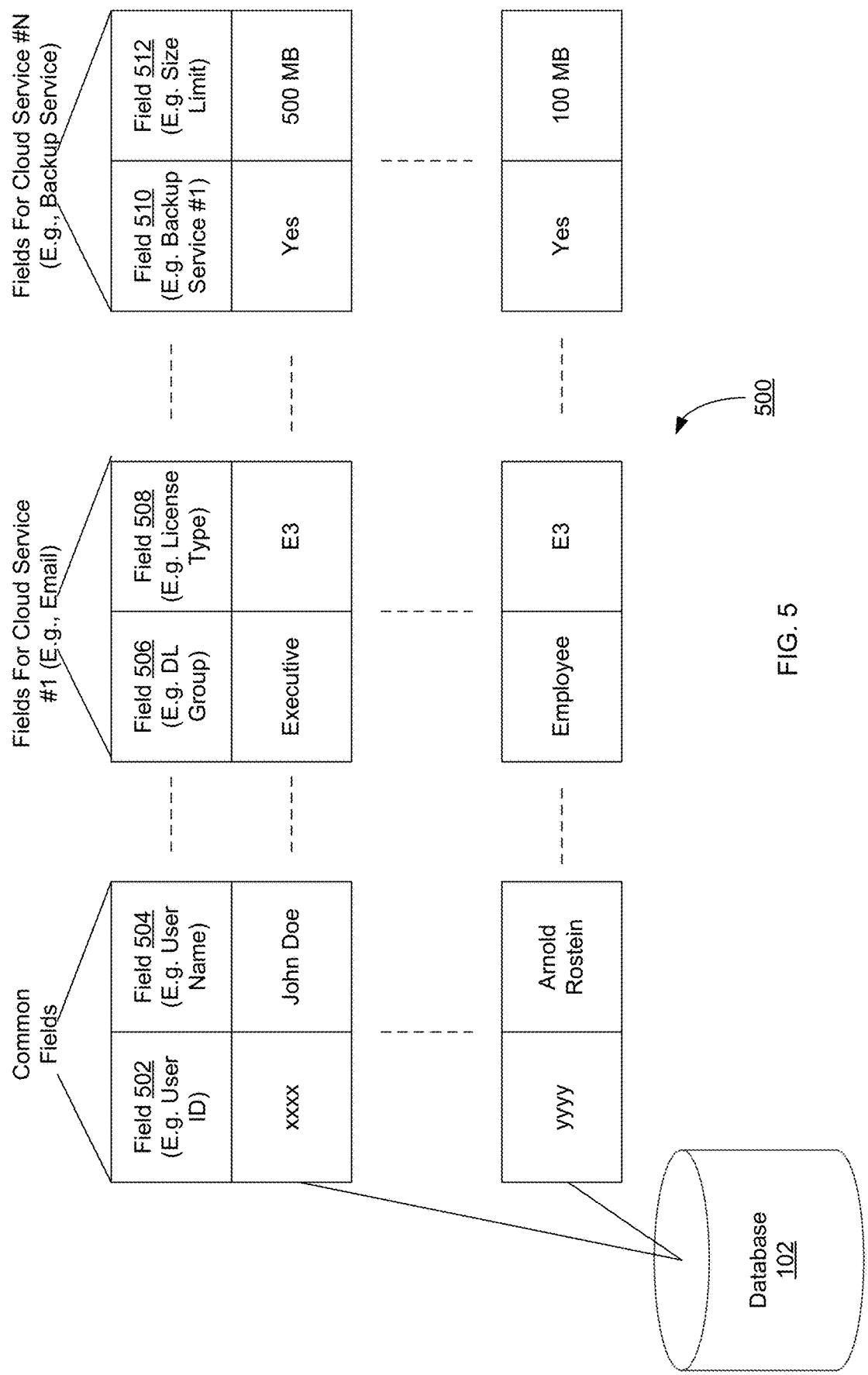
FIG. 5 illustrates one example of user records that can be in the database in association with users within an entity.

FIG. 5 illustrates one example of user records 500 that can be in the database 102 in association with users within an entity. As shown, the user records 500 may comprise common fields, such as fields 502 and 504. In this example, field 502 is for storing a user ID associated with the individual users. The user ID can be used to identified the individual users within the entity and can comprise alphabets and/or numbers. The field 504 is for storing a user name of the individual users. As shown, the user name can include a first and a last name of the individual users. The fields 502 and 504 can be used for multiple cloud services. For example, the user name of a particular user can be used to identify the particular user to multiple cloud services. As described above, the user name of the individual users can be used as criteria to match user information from one or more cloud services to specific user records.

As shown, the user records 500 may comprise fields, such as fields 506 and 508, indicating various settings configured for the given user for a first cloud service (e.g., an email service). In this example, the filed 506 is for storing information indicating an email group that a particular user of the entity may belong to on the first cloud service. For example, as shown, the user John Doe may belong to an executive email group such that emails addressed to that group may be forwarded to him. User Arnold Rostein belongs to an employee group such that emails addressed that group may be forwarded to Arnold. In this example, the field 508 is for storing information indicating a type of license a particular user is given on the first cloud service. The type of license granted to the user on the first cloud service may be used by the cloud service providers to control one or more features of the first cloud service that can be used by the particular user. Other fields in the user records 500 for storing settings of the first cloud service for the individual users may include an email address, a size limit for an email inbox, a size limit for an attachment, a level of email archive supported, and/or any other user settings.

The user records 500 may comprise fields, such as fields 510 and 512, indicating various settings configured for the individual users of the users for a second cloud service (e.g., a network storage service). In this example, field 510 is for storing information indicating a specific service that is backed up for the individual user, e.g., office 365 service. Field 512 is for storing information indicating a size limit for the backup service provided to the individual users. Other fields in the user records 500 for storing settings of the second cloud service for the individual users may include a speed for downloading and/or uploading a file to the network storage, one or more folders created for the network storage, a type of license granted to the user, and/or any other settings.

For updating the user records 500, the user information from a particular cloud service that is matched to a particular user record 500 may be compared with the user record to determine whether differences exist between the two. When it is determined that there are differences, the user record can be updated to incorporate the differences. As illustration, the user information associated with John Doe from the first cloud service can be matched to user record for user John Doe, and the fields in the user record of user John Doe can be updated based on the matched user information.

Although in some embodiments, as in the embodiment shown in FIG. 5, the settings for the first cloud service and the second cloud service can be separately stored in association with the user. However, this is not the only case. In some others embodiments, some or all settings of the first and cloud services may be consolidated. For example, a field of email address may be stored in association with individual users for the first and second cloud services.

II. Centralized User Management for Different Cloud Services

Having described the user information discovery and processing, and user record updating based on user information from different cloud services, attention is now directed to a management tool that can be implemented to facilitate centralized user management for the different cloud services. The management tool can be used to facilitate management of different cloud services for the users within the entity. For a given user, the management tool may present a user profile for a given user, which may comprise configurations of various settings for different cloud services for the given user. The user profile can be constructed from a user record stored in the database 102 for the given user as described herein. The management tool thus can provide a single point of control of cloud services subscribed to by the entity.

In one scenario, when an employee needs access to certain cloud services subscribed to by the entity, the management tool can generate a virtual user having a user record stored in database 102 as described above. An administrator of the entity can use the management tool to manage and provide access to the user on multiple cloud services. The management tool can be configured to establish user accounts for the user within various cloud services, store the relevant data for each of the cloud services, assign licenses of the cloud services to the user, join the user into groups and/or teams on the cloud services and/or to perform any other function. The management tool can be configured to stay in sync with all of the cloud services the user has access to. The management tool can thus aggregate user information related to a user from various cloud servers into a single conglomerate for managing the user's access to the cloud services.

A. A Common Graphical User Interface

In some embodiments, the management tool may provide a common graphical user interface for managing a given user of entity through a user profile. The user profile may comprise settings or attributes for different cloud services that can be used by the user. Changes to the attributes can be received from the common graphical user interface and propagated to corresponding cloud server or servers to effectuate the requested changes on the cloud servers.

Figure 3:
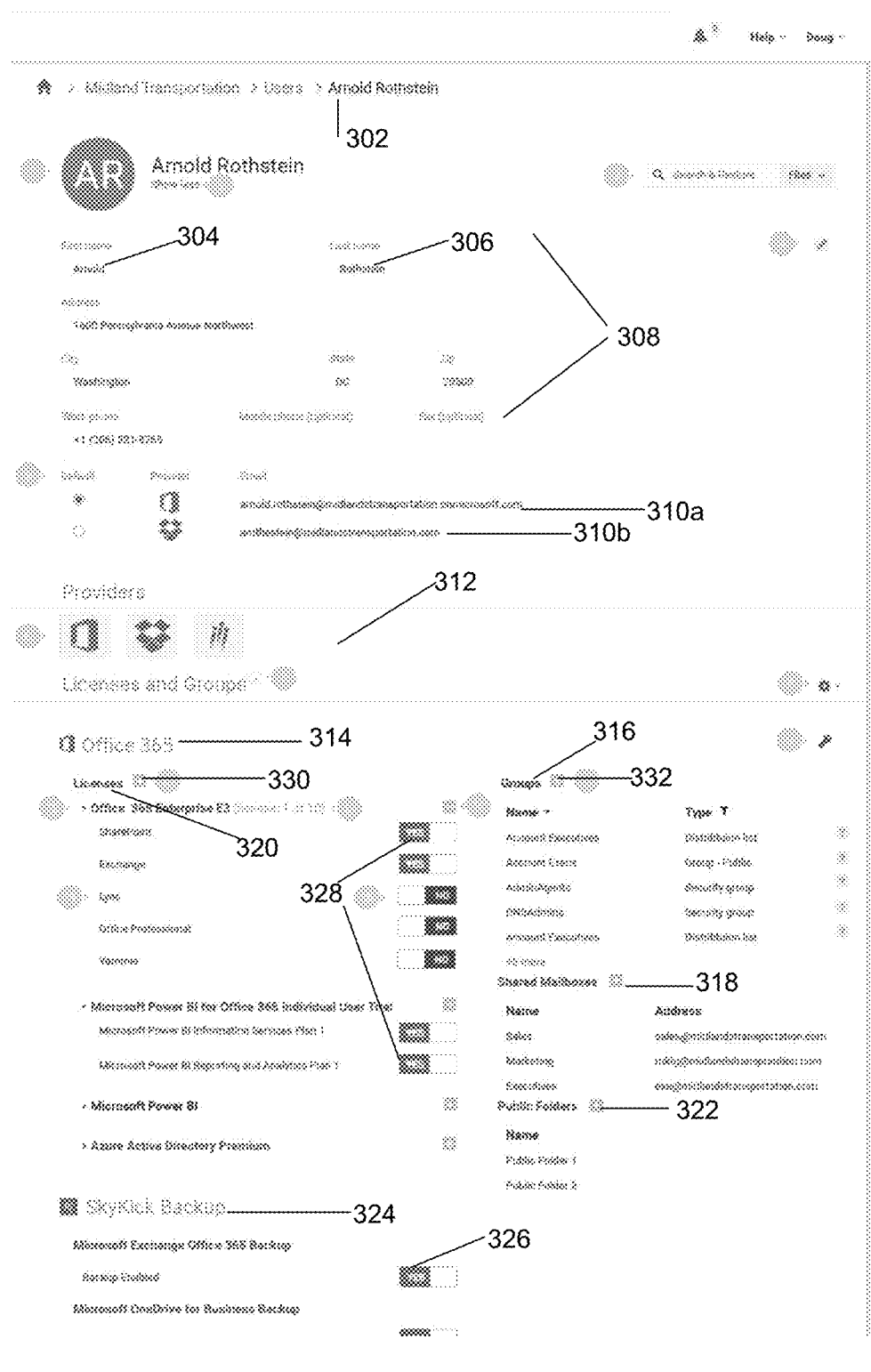
FIG. 3 illustrates an exemplary common graphical user interface for managing a user for different cloud services through a user profile in accordance with one embodiment.

FIG. 3 illustrates an exemplary common graphical user interface 300 for managing a user for different cloud services through a user profile in accordance with one embodiment. The interface 300 may be provided by a server 106 described and illustrated herein, and may be presented on a client computer 104 for access by an administrator of an entity. In this example, the entity for which the users are managed by the management tool is "midland transportation". As shown, the interface 300 can be configured to present a user profile 302 for a user within midland transportation, named "Arnold Rostein". The user profile 302 can be constructed by the management tool from a corresponding user record 500 stored in the database 102. As shown, the user profile 302 may include some common information 308 such as first name 304 and last name 306 of the user, an address of the user, a telephone of the user, an email address of the user, and/or any other common information regarding the user. Some of the common information 308 can be used as criteria for matching user information from different cloud services. For example, the first name 304 and last name 306 of the user can be used as criteria to match user information from one or more cloud services to specific users within the entity. The common information 308 may be obtained from corresponding common fields, such as fields 502 and 504, from a user record 500 for the user for whom the user profile 302 is constructed, e.g., user Arnold Rostein.

The user profile 302 may comprise email information 310 for the user. As shown, the user may have a different email address for a different cloud service. These email addresses can be shown in the interface 300 for administering the user. In this example, the user Arnold Rostein has an email address 310a for an office 365 service, and another email address 310b for a network storage service.

As shown, the interface 300 may comprise a section 312 for displaying and configuring various settings for different cloud services for the user. In this example, the user Arnold Rostein has two cloud services available for him to use— i.e., office 365 service 314, and a backup service 316. In this example, license information 320 regarding one or more licenses granted to Arnold Rostein for the office 365 service 314 is displayed in interface 300. As shown, an E3 license is currently assigned to user Arnold Rostein. As shown, other supported licenses for the office 365 service 314 can be granted to Arnold Rostein through a control 330 such that the administrator of the entity does not have to use a tool or interface provided by office 365 service to do that.

As shown, various specific settings 328 for the office 365 service configured for Arnold Rostein can be displayed in the interface 300. These settings may be grouped under specific features they correspond to. As described above, the values of the settings 328 can be obtained from corresponding cloud service and stored as part of user record for Arnold Rostein. As also shown, the interface 300 can provide user controls to enable an administrator of midland transportation to change the settings 328 for Arnold Rostein.

As also shown, the interface 300 can include group information 316 indicating one or more groups the user belongs to on a corresponding cloud service. The group information 316 may be obtained or synchronized from a corresponding cloud service. In this example, the user Arnold Rostein belongs to several groups on the office 365 service. As shown, control 332 can be provided in the interface 300 to enable the administrator to add Arnold Rostein to a group on the office 365 service without having to use a tool or interface provided by the office 365 service. As still shown, various other features such as shared mail box 318, public folders 322 on the office 365 office service, can also be displayed and configured for user Arnold Rostein. The various settings for Arnold Rostein for the office 365 service 314 described above can be obtained from corresponding fields in the user record 500 for user Arnold Rostein for the office 365 service.

Settings for another cloud service, such as a backup service 324, can also be displayed and configured in interface 300 for user Arnold Rostein. In this example, as shown, setting 326 may be displayed to show the office 365 service for user Rostein is configured to be on. The interface 300 similarly enables the administrator of the midland transportation to change the setting 326 for Arnold Rostein without having to use to a tool or interface provided by the backup service 324.

B. User Profile Update

As can be seen, modification of user settings for different cloud servicers can be centrally made through the interface 300. For example, a request for changing the share point option to "No" for user Arnold Rostein can be received from the interface 300. The request can then be processed to update a corresponding field for the user record 500 for Arnold Rostein stored in the database 102. That field in the user record 500 for Arnold Rostein can be updated to indicate the share point option for office 365 service for Arnold Rostein is "No". The change can be propagated to a corresponding cloud server, such as cloud server 110, to cause the server to change share point setting for Arnold Stein to "No". Another request for changing the user setting of enabling office 365 backup service to "No" can also be received from the interface 300. Similarly this change can cause the database 102 to update the user record for Arnold Rostein accordingly, and cause a server, such as server 120, to change a corresponding user setting on the backup cloud service for Arnold Rostein. In this way, different user settings for different cloud services can thus be controlled for the same user through interface 300.

C. Centralized Authentication Management for Different Cloud Services

Many cloud service provider authenticate users with authentication standards or formats like OAuth, OpenID, Persona, SAML, or similar. These standards can specify a process for resource owners to authorize third-party access to their server resources without sharing their credentials. The authentication mechanism for a particular cloud service may utilize an implementation of one of these standards or formats or a similar authentication standard or format. In some embodiments, the management tool can be used to redirect an administrator or individual user of the entity to a login page provided by the particular cloud service provider to engage in the authentication process for obtaining access to the particular cloud service. For example, the management tool may be implemented to allow the administrator of the entity to register a user to use the particular cloud service by redirecting the administrator to a login page provided by the particular cloud service provider so that the administrator can authenticate him/herself. The management tool may not actually collect any of the password information for such an authentication and authorization process. The management tool however can be sent one or more tokens from the particular cloud service provider based on the authorization standard, which can be used for token-based service calls.

Figure 6:
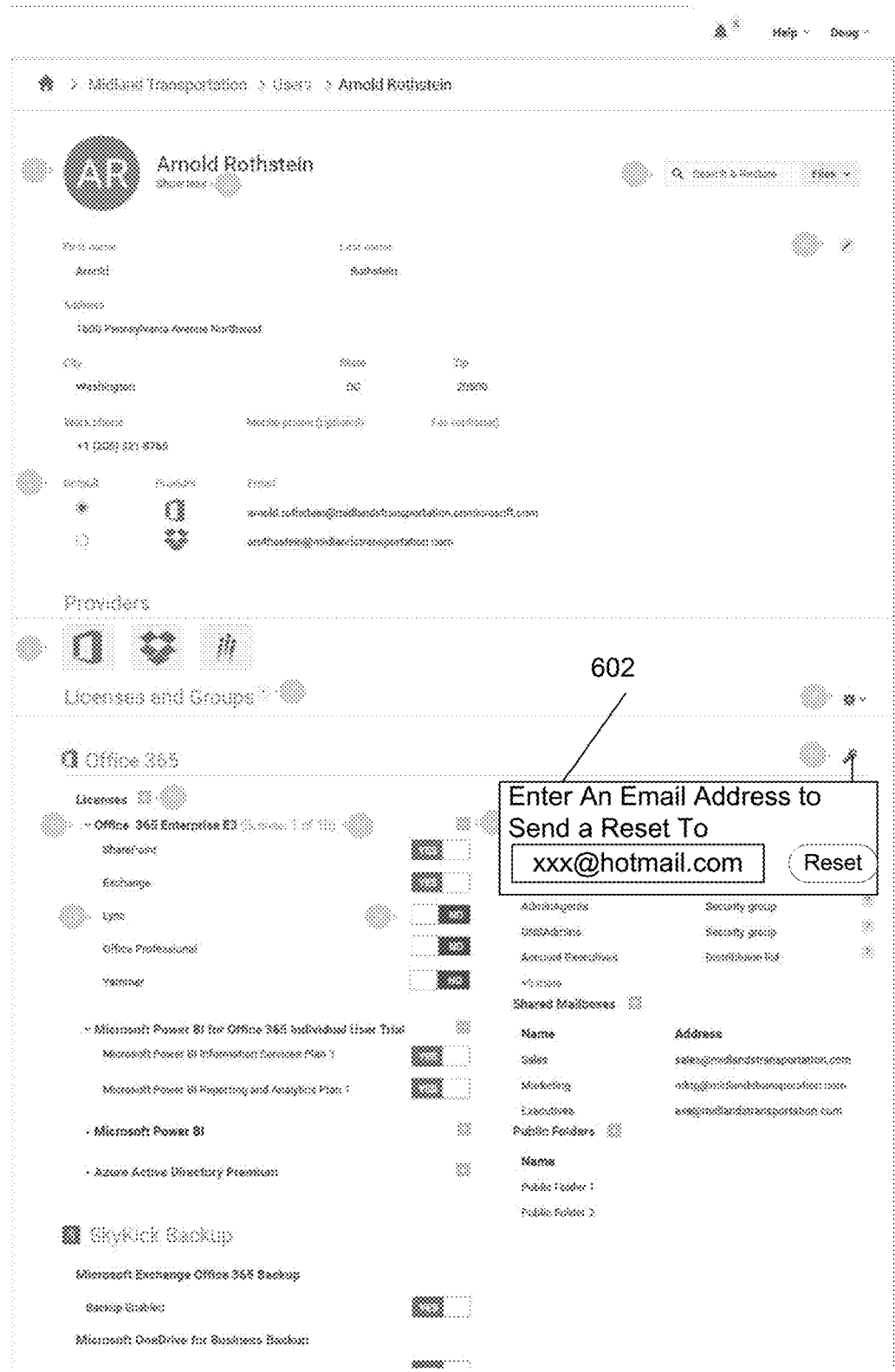
FIG. 6 illustrates the interface shown in FIG. 3 can be used to allow a password of a user for a particular cloud service to be reset.
Figure 7:
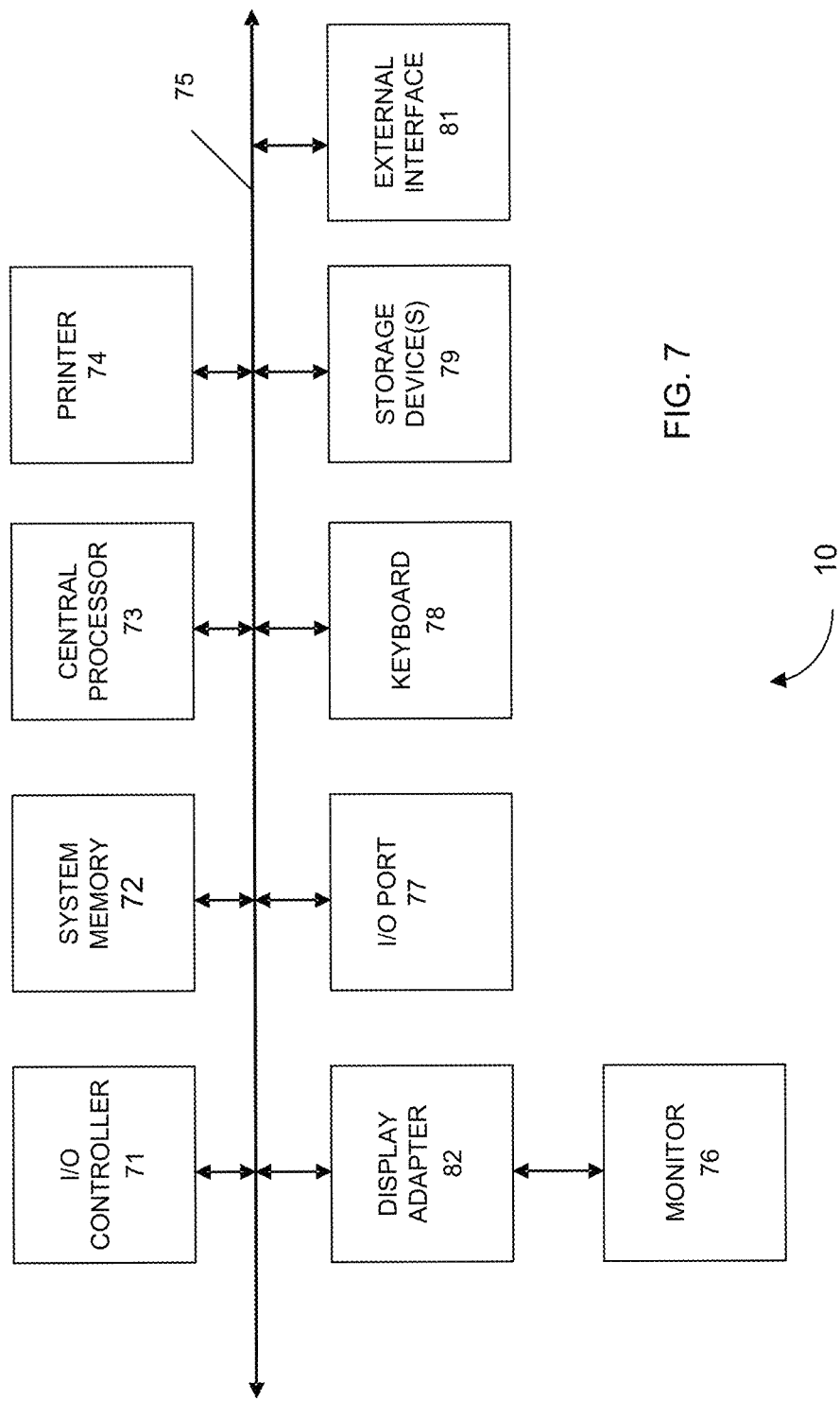
FIG. 7 shows examples of subsystems in a computer apparatus implementing various embodiments.

In some embodiments, the management tool can also allow a password of a user for a particular cloud service to be reset. FIG. 6 illustrates this. As shown in FIG. 6, the interface 300 shown in FIG. 3 can enable an administrator of the entity and/or a user of the entity (i.e., the user for whom the user profile is displayed in the interface 300), to send a password reset link for office 365 service to a specified email address for that user. As shown, the administrator or the user can be enabled to enter an email address in an input box 602, which can be presented as part of the interface 300 when the administrator or user clicks the tool icon 604. The password reset link can direct the user to a page provided by the particular cloud service provider, where the user can enter existing password to authenticate him/herself and a new password to replace the existing password.

D. A Process for Changing a Cloud Service Setting by Updating a User Profile

Figure 4:
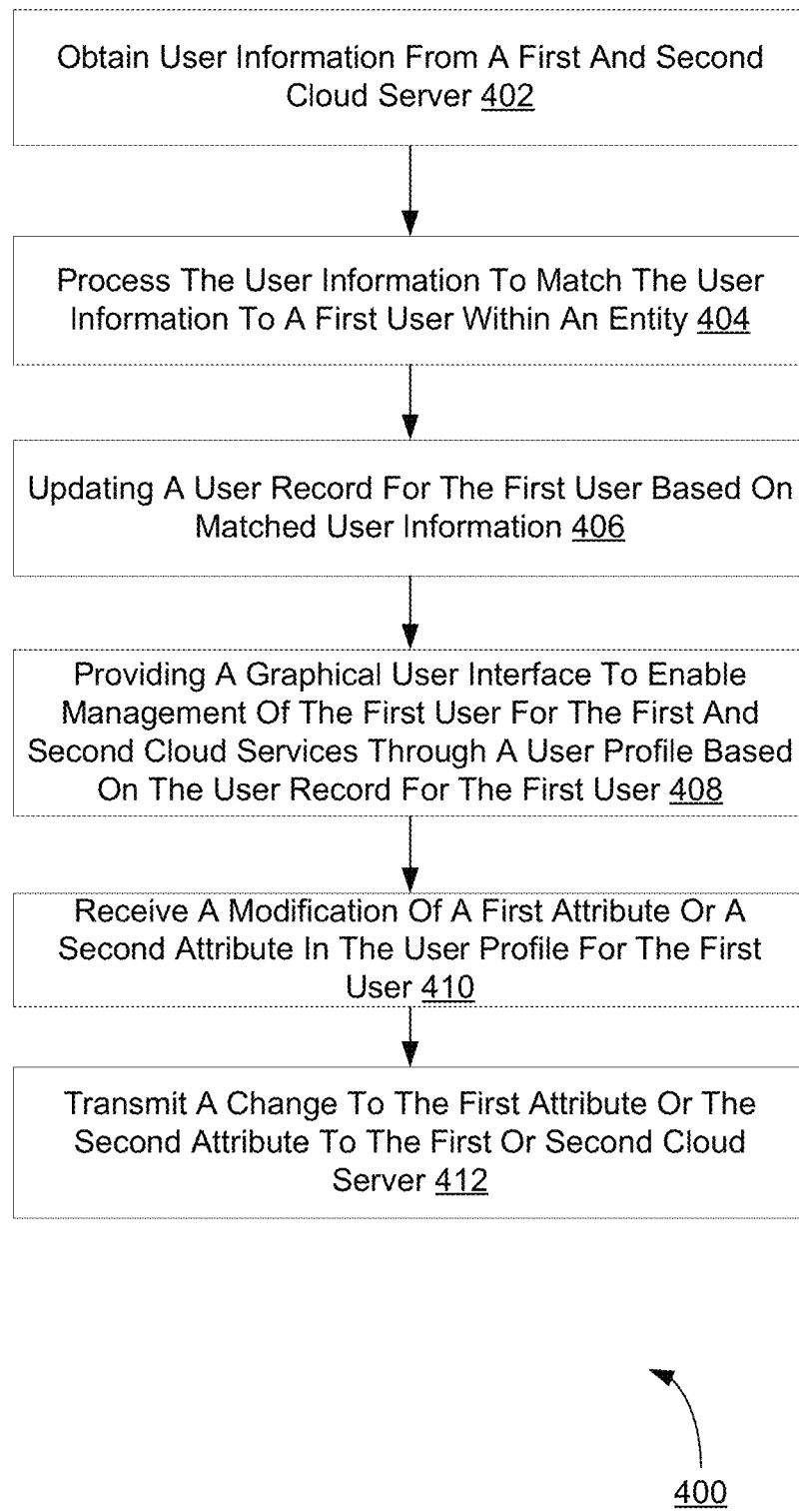
FIG. 4 illustrates an exemplary method for managing a user for different cloud services through a user profile in accordance with the disclosure.

FIG. 4 illustrates an exemplary method for managing a user for different cloud services through a user profile in accordance with the disclosure. The method presented in FIG. 4 and described below is intended to be illustrative and non-limiting. The particular series of processing steps depicted in FIG. 4 is not intended to be limiting. It is appreciated that the processing steps may be performed in an order different from that depicted in FIG. 4 and that not all the steps depicted in FIG. 4 need be performed.

In some embodiments, the method depicted in flowchart 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of flowchart 400 in response to instructions stored electronically on an electronic storage medium. The one or more processing devices may include one or more devices configured through hardware, firmware, and/or software to be specifically designed for execution of one or more of the operations of flowchart 400.

At an operation 402, user information can be obtained from a first cloud server or a second cloud server. The user information obtained from the first cloud server can be pertinent to a first set of users within an entity, such as a company, for use of a first cloud service provided by the first cloud server. For example, the first cloud service may be a cloud-based email service provided to the first set of users, and the user information obtained from the first cloud server may indicate settings or activated features for individual ones of the first set of users for using the email service. The user information obtained from the second cloud server can be pertinent to a second of users within the entity for use of a second cloud service provided by the second cloud server. For example, the second cloud service may be a cloud-based network storage service provided to the second set of users, and the user information obtained from the second cloud server may indicate settings or activated features for individual ones of the second set of users for using the network storage service. Some or all of the first set of users may not be in the second set.

At an operation 404, the user information obtained at 402 can be processed to be matched to a first user within the entity. The processing at 404 may involve analyzing the user information from the first cloud server, and matching the user information from the first cloud server based on a first criteria. The processing at 404 may also involve analyzing the user information from the second cloud server, and match the user information from the second cloud server based on first criteria. The first and second criteria can be different. For example, the first criteria can be an email address such that once an email address in the user information from the first cloud server is found to match an email address associated with the first user as being stored in a database of the entity, user information associated with that email address from the first cloud server is matched to the first user. The second criteria can be a user's name such that once a real-world name in the user information from the second cloud server is found to match a real-world name of the first user as being stored in the database of the entity, user information associated with that that name from the second cloud server is matched to the first user.

At an operation 406, a user record for the first user can be updated based on the user information matched to the first user at 404. The user record for the first user can be stored in the aforementioned database of the entity, and can contain fields of various settings or activated features for various cloud services for the first user. The user record for the first user can include a set of fields indicating settings or activated features for the first user for the first cloud service, and another set of fields indicating settings or activated features for the first user for the second cloud service. The user record can be updated based on the user information from the first cloud server that is matched to the first user at 404. For example, the matched user information from the first cloud server may indicate a change to a type of license that is granted to the first user for using the first cloud service. A corresponding field in the user record for the first user, e.g., license type for the first cloud service, can be updated accordingly. Similarly, the matched user information from the second cloud server may indicate the first user is added to a particular group on the second cloud service. A corresponding field in the user record for first user, e.g., a group the first user belongs on the second cloud service, can be added accordingly.

At an operation 408, a graphical user interface may be provided to enable management of the first user for various cloud services through a user profile for the first user. The user profile can be constructed from the user record for the first user and reflect various settings and activated features for the first user for various cloud services. The user profile for the first user may comprise a first attribute and a second attribute. The first attribute may indicate a setting of the first cloud service for the first user, e.g., a type of license that is granted to the first user for the first cloud service. Similarly, the second attribute may indicate a setting of the second cloud service for the first user, e.g., a group the first user belongs to on the second cloud service. The graphical user interface may enable an administrator of the entity to change the various settings or activated features for the first user for the various cloud services. An example of such an interface is illustrated in FIG. 3 and described herein.

At an operation 410, a modification of the first attribute or a modification of the second attribute can be received from the graphical user interface provided at 408. For example, the administrator may change the type of license granted to the first user for the first cloud service to a different license through the graphical user interface; or may add the first user to another group on the second cloud service through graphical user interface.

At an operation 412, the change to the first attribute or the second attribute can be transmitted to a respective one of the first and second cloud servers. Operation 412 may involve determining an appropriate cloud server for propagating the change received at 410, updating the user record for the first user based on the change received at 410, refreshing the graphical user interface to reflect the change received and/or any other sub-operations.

III. Computer System

Any of the computer systems mentioned herein may utilize any suitable number of subsystems. Examples of such subsystems are shown in FIG. 5 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of managing a plurality of users of an entity for using cloud services, the plurality of users including a first user of the entity, the cloud services including a first cloud service and a second cloud service, the method comprising performing by a computer system:
   obtaining, from each of the cloud services, respective user information, the obtained user information including first user information from the first cloud service and second user information from the second cloud service;
   matching the first user information from the first cloud service to the user information from the first cloud service to the plurality of users based on first criteria, and matching the second user information from the second cloud service to the plurality of users of the entity based on second criteria;
   updating user records associated with the plurality of users of the entity using the matched user information from the first cloud service and the second cloud service, wherein the updating of the user records comprises:
      updating a first field in a user record for the first user of the entity using user information from the first cloud service that is matched to the first user, and
      updating a second field in the user record for the first user of the entity using user information from the second cloud service that is matched to the first user;
   constructing user profiles for the plurality of users using the user records, wherein the user profiles includes a first user profile for a first user comprising a first attribute corresponding to the first field and a second attribute corresponding to the second field;
   providing a graphical user interface to enable management of the plurality of users for the cloud services through the user profiles, the graphical user interface enabling managing the first cloud service and the second cloud service for the first user through the first user profile;
   receiving, from the graphical user interface a request, a modification of the first attribute or the second attribute in the first user profile;
   if a change in the received modification is for the first attribute, transmitting the change to the first attribute to the first cloud service; and
   if the change in the received modification is for the second attribute, transmitting the change to the second attribute to the second cloud service.

2. The method of claim 1, wherein the first criteria is distinct and different from the second criteria.

3. The method of claim 1, wherein the first criteria specifies the first user information from the first cloud service is matched to a specific one of the plurality of users based on an email address in the first user information from the first cloud service matching an email address associated with the specific one of the plurality of users, and wherein the second criteria specifies a user record in the second user information from the second cloud service is matched to the specific one of the plurality of users based on a user name in the second user information from the second cloud service matching a user name for the specific one of the plurality of users.

4. The method of claim 1, wherein the first attribute indicates a group the first user of the entity belongs to for the first cloud service, or a license the first user of the entity is granted for using the first cloud service.

5. The method of claim 1, further comprising receiving, from the graphical user interface, a request to modify the first attribute and the second attribute in the first user profile.

6. The method of claim 1, further comprising:
   processing the first user information from the first cloud service to identify a first set of user records not associated with any of the plurality of the users; and
   generating a user profile based on the identified the first set of user records.

7. The method of claim 6, further comprising processing the second user information from the second cloud service to identify a set of user records not associated with any of the plurality of the users, and wherein the user profile is generated further based on the identified set of user records.

8. The method of claim 1, wherein the matching includes a heuristic or fuzzy matching rule.

9. The method of claim 8, wherein the heuristic or fuzzy matching rule specifies if a threshold number of alphabets in a name obtained from the cloud service matches a user name of the first user or the second user.

10. A system for managing a plurality of users of an entity for using cloud services, the plurality of users including a first user of the entity, the cloud services including a first cloud service and a second cloud service, wherein the system comprises a hardware processor configured by machine-readable instructions to cause the system to perform:
   obtaining, from each of the cloud services, respective user information, the obtained user information including first user information from the first cloud service and second user information from the second cloud service;
   matching the first user information from the first cloud service to the user information from the first cloud service to the plurality of users based on first criteria, and matching the second user information from the second cloud service to the plurality of users of the entity based on second criteria;
   updating user records associated with the plurality of users of the entity using the matched user information from the first cloud service and the second cloud service, wherein the updating of the user records comprises:
      updating a first field in a user record for the first user of the entity using user information from the first cloud service that is matched to the first user, and
      updating a second field in the user record for the first user of the entity using user information from the second cloud service that is matched to the first user;
   constructing user profiles for the plurality of users using the user records, wherein the user profiles includes a first user profile for a first user comprising a first attribute corresponding to the first field and a second attribute corresponding to the second field;
   providing a graphical user interface to enable management of the plurality of users for the cloud services through the user profiles, the graphical user interface enabling managing the first cloud service and the second cloud service for the first user through the first user profile; receiving, from the graphical user interface a request, a modification of the first attribute or the second attribute in the first user profile;

if a change in the received modification is for the first attribute, transmitting the change to the first attribute to the first cloud service; and if the change in the received modification is for the second attribute, transmitting the change to the second attribute to the second cloud service.

11. The system of claim 10, wherein the first criteria is distinct and different from the second criteria.

12. The system of claim 10, wherein the first criteria specifies the first user information from the first cloud service is matched to a specific one of the plurality of users based on an email address in the first user information from the first cloud service matching an email address associated with the specific one of the plurality of users, and wherein the second criteria specifies a user record in the second user information from the second cloud service is matched to the specific one of the plurality of users based on a user name in the second user information from the second cloud service matching a user name for the specific one of the plurality of users.

13. The system of claim 10, wherein the first attribute indicates a group the first user of the entity belongs to for the first cloud service, or a license the first user of the entity is granted for using the first cloud service.

14. The system of claim 10, wherein the processor is further configured by the machine-readable instructions to cause the system to perform: receiving, from the graphical user interface, a request to modify the first attribute and the second attribute in the first user profile.

15. The system of claim 10, wherein the processor is further configured by the machine-readable instructions to cause the system to perform:

processing the first user information from the first cloud service to identify a first set of user records not associated with any of the plurality of the users; and generating a user profile based on the identified the first set of user records.

16. The system of claim 15, wherein the processor is further configured by the machine-readable instructions to cause the system to perform: processing the second user information from the second cloud service to identify a set of user records not associated with any of the plurality of the users, and wherein the user profile is generated further based on the identified set of user records.

17. A computer program product comprising a non-transitory tangible medium including computer system executable code for a computer system for managing a plurality of users of an entity for using cloud services, the computer system including a processor, a memory and a display for, the plurality of users including a first user of the entity, the cloud services including a first cloud service and a second cloud service, wherein the computer program product comprises code that directs the processor to perform:

obtaining, from each of the cloud services, respective user information, the obtained user information including first user information from the first cloud service and second user information from the second cloud service;

matching the first user information from the first cloud service to the user information from the first cloud service to the plurality of users based on first criteria, and matching the second user information from the second cloud service to the plurality of users of the entity based on second criteria;

updating user records associated with the plurality of users of the entity using the matched user information from the first cloud service and the second cloud service, wherein the updating of the user records comprises:

updating a first field in a user record for the first user of the entity using user information from the first cloud service that is matched to the first user, and updating a second field in the user record for the first user of the entity using user information from the second cloud service that is matched to the first user;

constructing user profiles for the plurality of users using the user records, wherein the user profiles includes a first user profile for a first user comprising a first attribute corresponding to the first field and a second attribute corresponding to the second field;

providing a graphical user interface to enable management of the plurality of users for the cloud services through the user profiles, the graphical user interface enabling managing the first cloud service and the second cloud service for the first user through the first user profile;

receiving, from the graphical user interface a request, a modification of the first attribute or the second attribute in the first user profile;

if a change in the received modification is for the first attribute, transmitting the change to the first attribute to the first cloud service; and if the change in the received modification is for the second attribute, transmitting the change to the second attribute to the second cloud service.

18. The computer product of claim 17, wherein the first criteria is distinct and different from the second criteria.

19. The computer product of claim 17, wherein the first criteria specifies the first user information from the first cloud service is matched to a specific one of the plurality of users based on an email address in the first user information from the first cloud service matching an email address associated with the specific one of the plurality of users, and wherein the second criteria specifies a user record in the second user information from the second cloud service is matched to the specific one of the plurality of users based on a user name in the second user information from the second cloud service matching a user name for the specific one of the plurality of users.

20. The computer product of claim 17, wherein the first attribute indicates a group the first user of the entity belongs to for the first cloud service, or a license the first user of the entity is granted for using the first cloud service.

21. The computer product of claim 17, wherein the code directs the processor to further perform: receiving, from the graphical user interface, a request to modify the first attribute and the second attribute in the first user profile.

22. The system of claim 17, wherein the code directs the processor to further perform:

processing the first user information from the first cloud service to identify a first set of user records not associated with any of the plurality of the users; and generating a user profile based on the identified the first set of user records.

* * * * *